July 27, 1926.
H. DIXON
1,593,759
VEHICLE SPRING
Filed Sept. 7, 1923
2 Sheets-Sheet 2
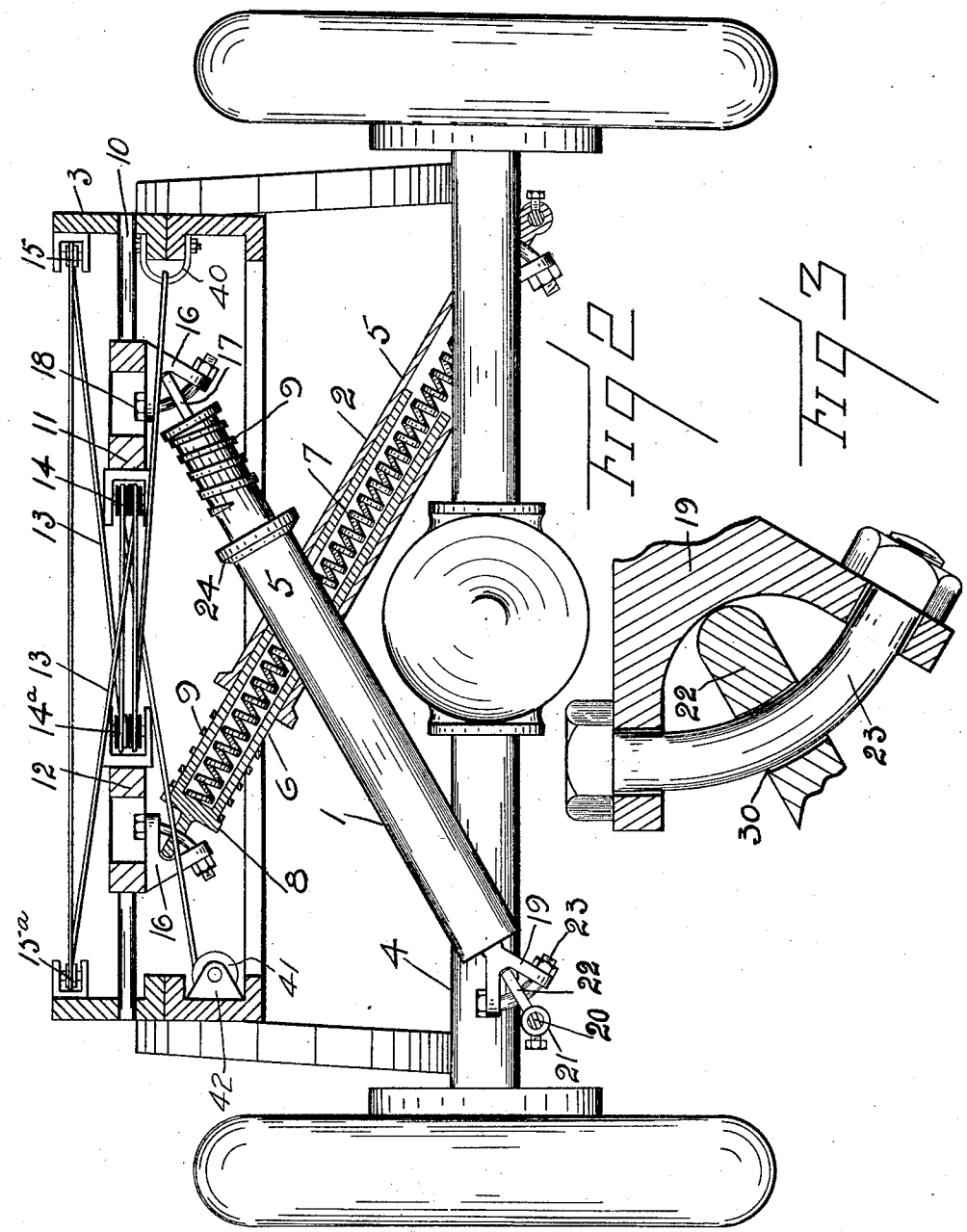

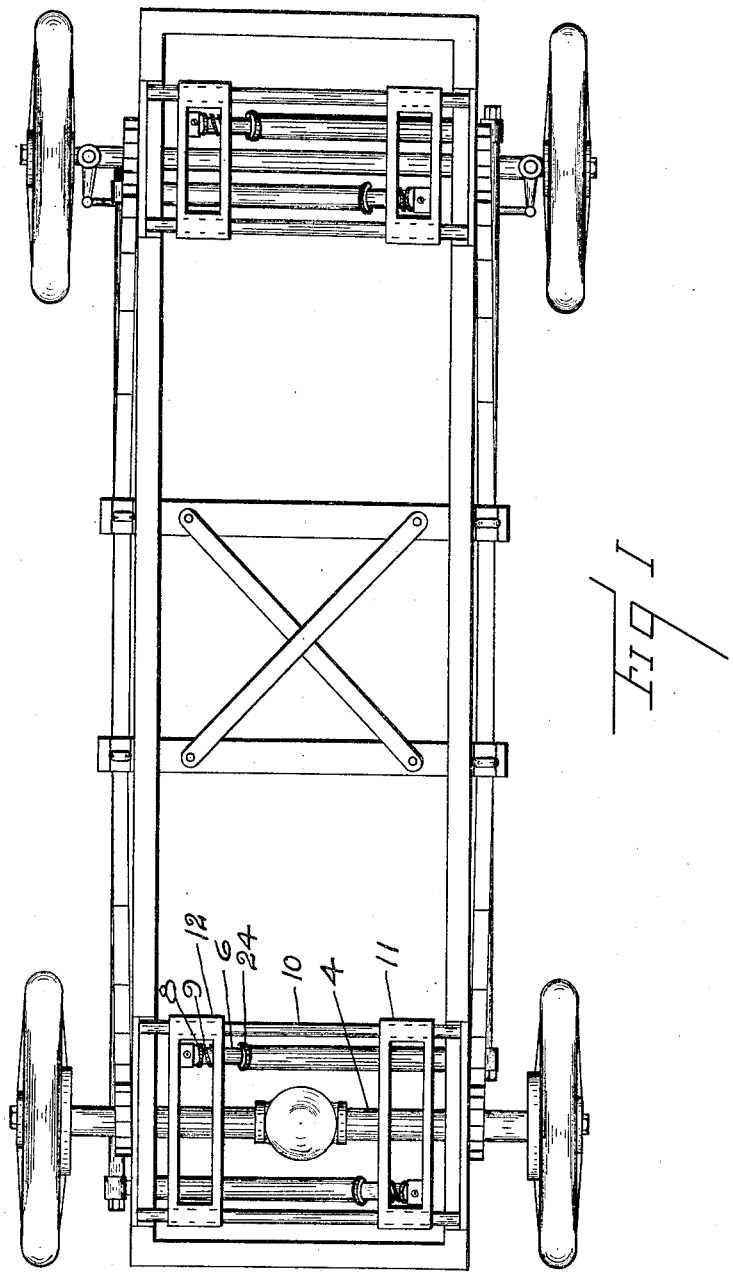

Patented July 27, 1926.

1,593,759

UNITED STATES PATENT OFFICE.

HENRY DIXON, OF COLLINGWOOD, ONTARIO, CANADA.

VEHICLE SPRING.

Application filed September 7, 1923. Serial No. 661,426.

In my application Serial No. 550,414, filed April 7, 1922, now Patent No. 1,466,817 dated September 4, 1923, I have shown and described a vehicle spring comprising two helical coils enclosed in a tubular housing, composed of telescopic members, and a buffer coil exterior to said housing exerting its force against the telescopic members when the first-mentioned coils are compressed.

In the same application I have shown a suspension in which two of these springs are arranged at the side of the vehicle with the tubular housings converging towards, and attached at their lower ends to, the axle, and connected at their upper ends by adjusting means, for causing their united flexions, and, for changing the angle of convergence and respectively increasing or decreasing the initial pressure exerted by them against the stress.

According to my present invention I propose to use springs involving the same structural principles as those forming the subject matter of the above application, but instead of arranging them in converging pairs at the sides, I place two springs at the front and two at the back of the vehicle, and so mount the springs that they will cross or intersect each other interjacent their ends and exert pressure in oppositely oblique directions to resiliently sustain, and resist the canting of, the superstructure.

In the drawings:

Fig. 1 is a plan view of a chassis of a vehicle showing the arrangement of the parts, Fig. 2 is a sectional end elevation of the same, and Fig. 3 is a fragmentary detail view of one of the shackles by which the springs are mounted.

Like characters of reference refer to like parts throughout the specification and drawings.

According to my present invention the vehicle suspension consists of two springs 1 and 2 connected to the superstructure 3 and to the rear axle 4 and similar springs connected to the superstructure and to the front axle. Each of the springs 1 and 2 comprises a telescopic housing or casing consisting of a tubular member 5, formed at its inner end with a collar 24, and a tubular member 6 formed at its outer end with a similar collar 8. Contained within the tubular members 5 and 6 of each housing is a helical coil 7 continually exerting pressure against said members axially of the housing to resist their inward telescopic movement, and encircling the tubular member 6, between the collar 8 and the collar 24, is a helical coil 9 the length of which is less than the distance between the collars 24 and 8 when the spring 7 is not under tension. Connected to the superstructure 3, transversely of the vehicle, are parallel guide rods 10 on which are mounted two elongated slides 11 and 12 adjusted lengthwise of the guide rods. A convenient means for effecting the adjustment of the slides 11 and 12 consists in providing the slide 11 with a pulley 14 and the slide 12 with a pulley $14^a$ and attaching a clevis or eye 40 to one side of the superstructure and mounting a winding drum 41 in bearings 42 connected to the other side of the superstructure. The clevis 40 and drum 41 are shown below the plane of the slides 11 and 12 and mounted in bearings connected to the superstructure above the clevis or eye 40 and drum 41 are pulleys 15, $15^a$ respectively. A rope or cable 13 is attached at one end to the clevis or eye 40 and passes in succession around the pulleys $14^a$, 14, $15^a$, 15, $14^a$, 14, to the winding drum 41, the rotation of which in one direction winds up the rope or cable 13 and moves the slides 11 and 12 towards each other and the rotation of which in the opposite direction permits the rope or cable to play out and allow the slides to move in the opposite direction. The winding drum 41 may be held by any suitable detent device such as an ordinary ratchet and pawl.

The upper ends of the springs are pivotally or rockably connected with the slides, and the lower ends with the axle, by any usual or approved means. In the preferred construction the slides 11 and 12 are formed, or provided, with forked brackets 16 and the upper ends of the tubular members 6 are provided with blade like mountings or members 17 entered between the forks of the brackets 16. Passing through the forks of the brackets 16 and through the members 17 are curved bolts or shackles 18 by which the members 17 and brackets 16 are coupled together. The bolt apertures in the members 17 are curved similarly to that shown in Fig. 3, for the free rocking movement of the brackets 16 during the adjustment of the springs and during the compression and expansion of the coils. The lower ends of the tubular members 5 are provided with forked brackets or members 19 corresponding in structural details to the brackets or members 16. The axle 4 is constructed with bolts or pins 20 on which are mounted the hubs 21 of the blade like mountings or members 22, which enter between the forks of the brackets 19. Passing through the forks of the brackets 19 and through the members 22 are bolts or shackles 23. For the free rocking movement of the forked brackets 19 on the links 22 the latter are formed with curved bolt apertures 30, see Fig. 3.

As shown in Fig. 2 the spring 1 is inclined diagonally upward from the left extremity of the axle 4, transversely of the vehicle, towards the right side of the superstructure and the spring 2 is likewise inclined diagonally upward from the right extremity of the axle towards the left side of the superstructure. This inclination of the springs from the axle to the superstructure enables each spring to impose on the superstructure a direct pressure, diagonally transverse of the vehicle, for resisting the canting movement of the superstructure, and the above described mounting of the springs permits each spring to act independently during the canting movement, so that the spring subjected to the stress will be free to compress and the other will be free to expand.

To prevent interference between the springs during their flexions the lower ends of the housings are mounted at opposite sides of the axle, and the upper ends of the springs are connected to the opposite ends of the elongated slides. This arrangement provides a sufficient clearance for the free movement of the springs during the adjustment and flexions of the parts.

The flexions during the up and down movement of the superstructure and axle results in the united action of the springs 1 and 2, but during the canting movement of the vehicle each of the springs 1 and 2 acts independently.

In explanation of this it can be assumed that the canting stress is applied to the right side of the superstructure. This canting stress is transmitted in a downward diagonal direction towards the left extremity of the axle, first to the helical coil 7, and then to the buffer coil, the compression of the springs continuing until the force of the canting stress is expended. When this stress is expended the two coils 7 and 9 expand and restore the superstructure to the normal position. During the compression of the helical coil of the spring 1, the helical coil of the spring 2 expands and relieves the left side of the superstructure from the counter-strain. To obtain the fullest resiliency of the springs the tension of the coils can be adjusted from time to time and this is effected by operating the adjusting ropes or cables 13 to move the springs towards the perpendicular and increase the tension or to move them in the opposite direction and decrease it.

Having thus fully described my invention, what I claim as new and desire to secure by Letters Patent is:

1. In a vehicle, the combination of a superstructure, an axle, two helical springs inclined in opposite directions transversely of the vehicle from the axle to the superstructure and imposing on the superstructure a direct pressure transversely of the superstructure for resisting its canting and its up and down movements, means for connecting said springs with the axle and other means for slidably connecting the springs to the superstructure for their united action during the up and down movements of the superstructure, and for their independent action during the canting movement of the superstructure, the spring subjected to stress resisting the canting movement and the other being free to expand.

2. In a vehicle the combination of a superstructure, an axle, two helical springs inclined in opposite diagonal directions transversely of the vehicle from the axle to the superstructure, and imposing on the superstructure a direct pressure transversely of the superstructure for resisting its canting and its up and down movements, means for hingedly connecting the lower ends of the springs to the axle, other means for slidably connecting the springs to the superstructure, adjusting means for changing the inclination of the springs relatively to the perpendicular, and means for hingedly connecting the upper ends of the springs to the adjusting means, the spring subjected to stress resisting the canting movement and the other being free to expand.

3. In a vehicle the combination of a superstructure, an axle, two helical springs inclined in opposite diagonal directions transversely of the vehicle from the axle to the superstructure, and imposing on the superstructure a direct pressure transversely of the superstructure for resisting its canting and its up and down movements, slideways connected to the superstructure, slides movable thereon, means for hingedly connecting the intersecting springs to the slides and to the axle, and means for adjusting the slides for changing the inclination of the springs relatively to the perpendicular and increasing or decreasing the force exerted by the springs on the axle and superstructure, whereby the spring subjected to stress will be free to compress and the other will be free to expand.

4. In a vehicle the combination of a superstructure, an axle, two springs inclined in opposite diagonal directions transversely of the vehicle from the axle to the superstructure, slideways connected with the superstructure, slides mounted thereon, forked members carried by the slides, mountings at the upper ends of the springs entered between the forks of said members, shackles passing through the forked members and mountings, forked members at the lower ends of the springs, mountings secured to the axle, shackles passing through last mentioned forked members and mountings, and means for moving the slides and adjusting the springs towards and from the perpendicular.

5. In a vehicle the combination of a superstructure, an axle, two helical springs inclined in opposite directions transversely of the vehicle from the axle to the superstructure, and imposing on the superstructure a direct pressure transversely of the superstructure for resisting its canting and its up and down movements, means for hingedly connecting the lower ends of the two springs to the axle, other means for slidably connecting the springs to the superstructure, adjusting means for changing the inclination of the springs relatively to the perpendicular, and increasing or decreasing the force exerted by the springs on the superstructure, and means for hingedly connecting the upper ends of the springs to the adjusting means, the spring subjected to stress resisting the canting movement and the other being free to expand.

Dated at the city of Toronto, in the county of York, and Province of Ontario, Dominion of Canada, this 9th day of July, A. D. 1923.

HENRY DIXON.